United States Patent
Kishi et al.

(10) Patent No.: US 12,270,473 B2
(45) Date of Patent: Apr. 8, 2025

(54) COUPLING STRUCTURE

(71) Applicant: IHARA SCIENCE CORPORATION, Tokyo (JP)

(72) Inventors: Toru Kishi, Higashine (JP); Miyoshi Kimura, Isesaki (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 0 days.

(21) Appl. No.: 18/247,941

(22) PCT Filed: Oct. 4, 2021

(86) PCT No.: PCT/JP2021/036685
§ 371 (c)(1),
(2) Date: Apr. 5, 2023

(87) PCT Pub. No.: WO2022/085415
PCT Pub. Date: Apr. 28, 2022

(65) Prior Publication Data
US 2023/0341051 A1     Oct. 26, 2023

(30) Foreign Application Priority Data
Oct. 20, 2020 (JP) .................. 2020-176003

(51) Int. Cl.
*F16J 15/10* (2006.01)
*F16L 19/025* (2006.01)
(Continued)

(52) U.S. Cl.
CPC ............. *F16J 15/10* (2013.01); *F16L 19/025* (2013.01); *F16L 23/024* (2013.01);
(Continued)

(58) Field of Classification Search
CPC .. F16J 15/10; F16J 15/12; F16J 15/121; F16J 15/122; F16L 23/024; F16L 23/032; F16L 23/08; F16L 19/025
See application file for complete search history.

(56) References Cited

U.S. PATENT DOCUMENTS 1,821,863 A * 9/1931 Wilson ................... F16L 23/20
                                                              29/451
3,594,022 A * 7/1971 Woodson ............ F16L 19/0218
                                                              285/354
(Continued)

FOREIGN PATENT DOCUMENTS

FR          2833680 A1    6/2003
JP          S5111217 A    1/1976
(Continued)

OTHER PUBLICATIONS

ISA Japan Patent Office, International Search Report Issued in Application No. PCTJP2021036685, Nov. 30, 2021, WIPO, 6 pages.
(Continued)

*Primary Examiner* — Gilbert Y Lee
(74) *Attorney, Agent, or Firm* — Alleman Hall & Tuttle LLP (57) ABSTRACT

In order to make it possible to ensure the axis alignment performance while reducing the processing cost, and to make a coupling structure compact to perform the coupling work and the detaching work of pipe members without difficulty even in a narrow work space, the coupling structure according to the invention includes a pipe coupling that couples a pair of pipe members each including a flange at an end portion in a state where the flanges of the pipe members face each other, an annular gasket interposed between the flanges of the pair of pipe members, and recesses formed individually in facing surfaces of the flanges facing each (Continued)

other, in which the annular gasket fitted into the respective recesses makes pipe axes of the pipe members and the annular gasket coincide with each other.

6 Claims, 8 Drawing Sheets (51) Int. Cl.
*F16L 23/024* (2006.01)
*F16L 23/032* (2006.01)
*F16L 23/08* (2006.01)
*F16L 23/18* (2006.01)

(52) U.S. Cl.
CPC ............ *F16L 23/032* (2013.01); *F16L 23/08* (2013.01); *F16L 23/18* (2013.01)

(56) References Cited

U.S. PATENT DOCUMENTS

| | | | | | |
|---|---|---|---|---|---|
| 5,145,219 | A | * | 9/1992 | Babuder | F16L 19/0212 285/379 |
| 5,340,170 | A | * | 8/1994 | Shinohara | F16L 27/0832 285/379 |
| 5,366,261 | A | * | 11/1994 | Ohmi | F16L 19/0212 285/379 |
| 5,630,592 | A | * | 5/1997 | Obara | F16L 23/20 277/614 |
| 5,700,014 | A | * | 12/1997 | Morita | B01J 3/03 285/332.2 |
| 6,073,969 | A | * | 6/2000 | Zimmerly | F16L 23/22 285/12 |
| 8,491,017 | B2 | * | 7/2013 | Kimura | F16L 23/16 285/411 |
| 8,979,137 | B2 | * | 3/2015 | Kimura | F16L 23/18 285/411 |
| 11,644,129 | B2 | * | 5/2023 | Uhlenkamp | F16L 21/02 277/614 |
| 2010/0230962 | A1 | | 9/2010 | Bongiorno | |
| 2010/0320699 | A1 | | 12/2010 | Takeda et al. | |
| 2012/0007358 | A1 | | 1/2012 | Mackey et al. | |
| 2012/0074694 | A1 | * | 3/2012 | Butte | F16L 23/12 277/609 |
| 2016/0138739 | A1 | * | 5/2016 | Shinohara | F16L 23/08 277/614 |
| 2018/0299042 | A1 | | 10/2018 | Ishibashi et al. | |

FOREIGN PATENT DOCUMENTS

| | | |
|---|---|---|
| JP | S54105918 U | 7/1979 |
| JP | H05296374 A | 11/1993 |
| JP | H07208665 A | 8/1995 |
| JP | H07233887 A | 9/1995 |
| JP | H08326943 A | 12/1996 |
| JP | H10002452 A | 1/1998 |
| JP | 2013068270 A | 4/2013 |
| JP | 2013124681 A | 6/2013 |
| JP | 3205452 U | 7/2016 |
| JP | 2016205408 A | 12/2016 |
| TW | 200907202 A | 2/2009 |

OTHER PUBLICATIONS

European Patent Office, Extended European Search Report Issued in Application No. 21882556.0, Jun. 19, 2024, Germany, 9 pages.
Japan Patent Office, Patent Grant Issued in Application No. 2020-176003, Sep. 5, 2024, 6 pages.
Japan Patent Office, Office Action Issued in Application No. 2020-176003, Jul. 23, 2024, 18 pages.
Taiwan Intellectual Property Office, Office action issued in Taiwan Application No. 110137256, Nov. 29, 2024, 8 pages.

* cited by examiner

COUPLING STRUCTURE

TECHNICAL FIELD

The present invention relates to a coupling structure formed by coupling a pair of pipe members via a pipe coupling.

BACKGROUND ART

As a conventional coupling structure, there is a structure, as described in Patent Literature 1, in which flanges provided at end portions of a pair of pipe members face each other and an annular gasket for ensuring the sealing performance is interposed between the flanges to couple the pair of pipe members via a pipe coupling.

In the coupling structure, a guide ring is used for obtaining the axis alignment performance of the pair of pipe members and the annular gasket. Specifically, first, recesses are formed in facing surfaces of the flanges facing each other, and the guide ring is fitted into the recesses. The guide ring is formed with a stepped portion by counter boring in the axial direction, and by positioning the annular gasket on the stepped portion, the pipe axes of the pipe members and the annular gasket coincide with each other.

However, the configuration using the guide ring as described above requires processing for forming the recesses in the flanges, which increases the processing cost. Further, the flanges become larger due to forming the recesses, which makes its use in a narrow work space difficult.

CITATION LIST

Patent Literature

Patent Literature 1: JP 2013-068270 A

SUMMARY OF THE INVENTION

Technical Problem

Therefore, it is a main object of the present invention to ensure the axis alignment performance while reducing the processing cost, and to make the coupling structure compact to make it possible to perform the coupling work and the detaching work of the pipe members without difficulty even in a narrow work space.

Solution to Problem

That is, a coupling structure according to the present invention includes a pipe coupling that couples a pair of pipe members each including a flange at an end portion in a state where the flanges of the pipe members face each other, an annular gasket interposed between the flanges of the pair of pipe members, and recesses formed individually in facing surfaces of the flanges facing each other, and the annular gasket fitted into the respective recesses makes pipe axes of the pipe members and the annular gasket coincide with each other.

According to the coupling structure configured as described above, fitting the annular gasket into the recesses formed on the facing surfaces of the flanges of the pair of pipe members can make the pipe axes of the pipe members and the annular gasket coincide with each other, so that the guide ring used in the conventional axis alignment can be eliminated.

Accordingly, it is possible to ensure the axis alignment performance while reducing the processing cost, and to make the coupling structure compact, which makes it possible to perform the coupling work and the detaching work of the pipe members without difficulty even in a narrow work space.

It is preferable that the annular gasket include a portion fitted into one of the recesses and a portion fitted into the other one of the recesses that have a cylindrical shape having the same diameter.

According to the aspect, there is no restriction on an orientation of the annular gasket when attached, and the sealing performance can be exhibited when the annular gasket is used in either orientation.

It is preferable that the coupling structure further include a retainer fixed to one of the flanges in a state of being attached to the annular gasket.

According to the aspect, the annular gasket is held in an axis-aligned state by fixing the retainer to the flange, so that the workability of pipe coupling can be further improved.

It is preferable that the coupling structure further include a locking mechanism interposed between the retainer and the annular gasket to lock the retainer to the annular gasket, the retainer have a shape obtained by cutting out a portion from an annular ring, and the locking mechanism include a locking groove formed in one of an inner peripheral surface of the retainer and an outer peripheral surface of the annular gasket and a protrusion provided on the other one of the inner peripheral surface of the retainer and the outer peripheral surface of the annular gasket, and fitted in the locking groove.

According to the aspect, the retainer can be easily attached to the annular gasket.

It is preferable that the retainer include a plurality of claws extending in the axial direction from a plurality of positions on an outer peripheral surface of the retainer, and the plurality of claws fitted into an outer peripheral surface of one of the flanges make the retainer fixed to the one flange.

According to the aspect, the retainer can exhibit a function of a so-called retaining ring, and the retainer can be easily fixed to the flange of the pipe member.

As a specific aspect, an aspect can be mentioned in which the pipe coupling includes a series of unit members that are coupled allowing rotation of adjacent ones of the unit members with respect to each other, and a fastener that couples unit members among the unit members at both ends to make the series of unit members in an annular shape, and the pipe coupling couples the pair of pipe members by fitting the unit members onto the flanges of the respective pipe members in a state where the flanges of the pair of pipe members face each other and fastening the fastener.

As another aspect, an aspect can be mentioned in which the pipe coupling includes a first nut member fitted into an outer periphery of one of the pipe members and formed with a male screw portion on an outer peripheral surface, and a second nut member fitted into an outer periphery of the other one of the pipe members and formed with a female screw portion on an inner peripheral portion, screwed with the male screw portion, and the pipe coupling couples the pair of pipe members by screwing the male screw portion of the first nut member and the female screw portion of the second nut member.

As still another aspect, an aspect can be mentioned in which the pipe coupling includes a pair of pinching members provided individually on the back of the flanges of the pair of pipe members, and a fastener that fastens the pair of pinching members, and the pipe coupling couples the pair of pipe members by fastening the pair of pinching members with the fastener.

Advantageous Effects of Invention

According to the present invention, it is possible to ensure the axis alignment performance while reducing the processing cost, and to make the coupling structure compact, which makes it possible to perform the coupling work and the detaching work of the pipe members without difficulty even in a narrow work space.

LIST OF REFERENCE CHARACTERS 100 coupling structure
10 pipe member
11 pipe body
12 flange
13 projection
14 inclined surface
15 stepped portion
20 pipe coupling
21 unit member
211 recessed groove
212 inclined surface
22 fastener
221 bolt member
222 nut member
30 annular gasket
30a outer peripheral surface
40 recess
40a inner peripheral surface
50 retainer
51 claw
60 locking mechanism
61 locking groove
62 protrusion
71 first nut member
711 distal end portion
72 second nut member
721 housing recess
80 pinching member
90 fastener

DESCRIPTION OF EMBODIMENT

Hereinafter, an embodiment of the present invention will be described with reference to the drawings.

Figure 1:
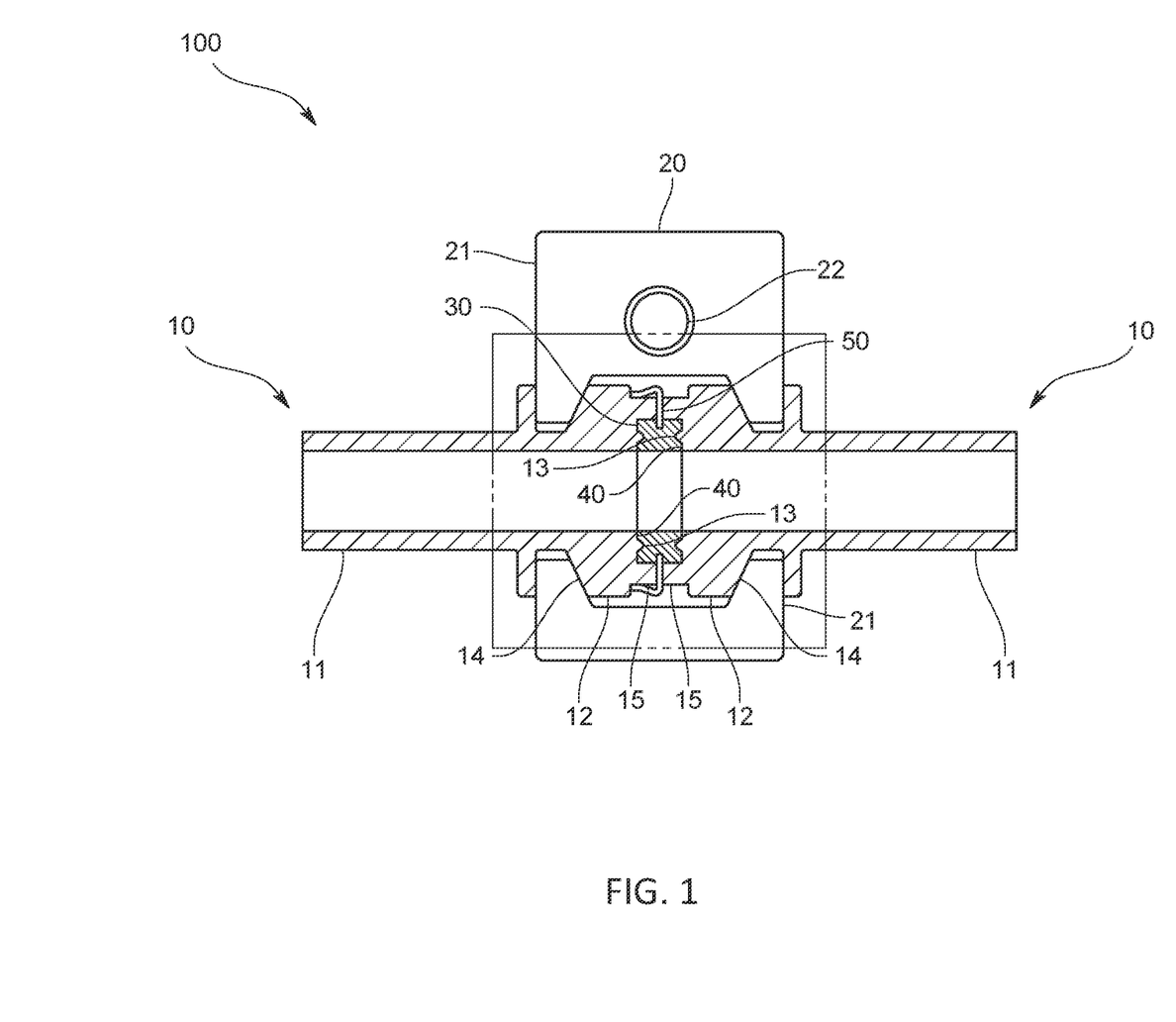
FIG. 1 is a cross-sectional view illustrating a coupling structure in an embodiment of the present invention.

A coupling structure 100 of the present embodiment is formed by coupling a pair of pipe members 10 via a pipe coupling 20. Specifically, as illustrated in FIG. 1, the coupling structure 100 includes the pipe coupling 20 that couples the pair of pipe members 10 in a state of facing each other and an annular gasket 30 interposed between the pair of pipe members 10, in which the pair of pipe members 10 are coupled airtightly.

The pipe members 10 each include a pipe body 11 and a flange 12 provided at an end of the pipe body 11. The flange 12 is provided with an annular projection 13 on a front end surface thereof, and an inclined surface 14 formed by increasing the diameter toward the front end in this embodiment is formed on the back of the flange 12. Further, a stepped portion 15 is formed on an outer peripheral surface of the flange 12 by reducing the diametral dimension of the flange 12.

Figure 2:
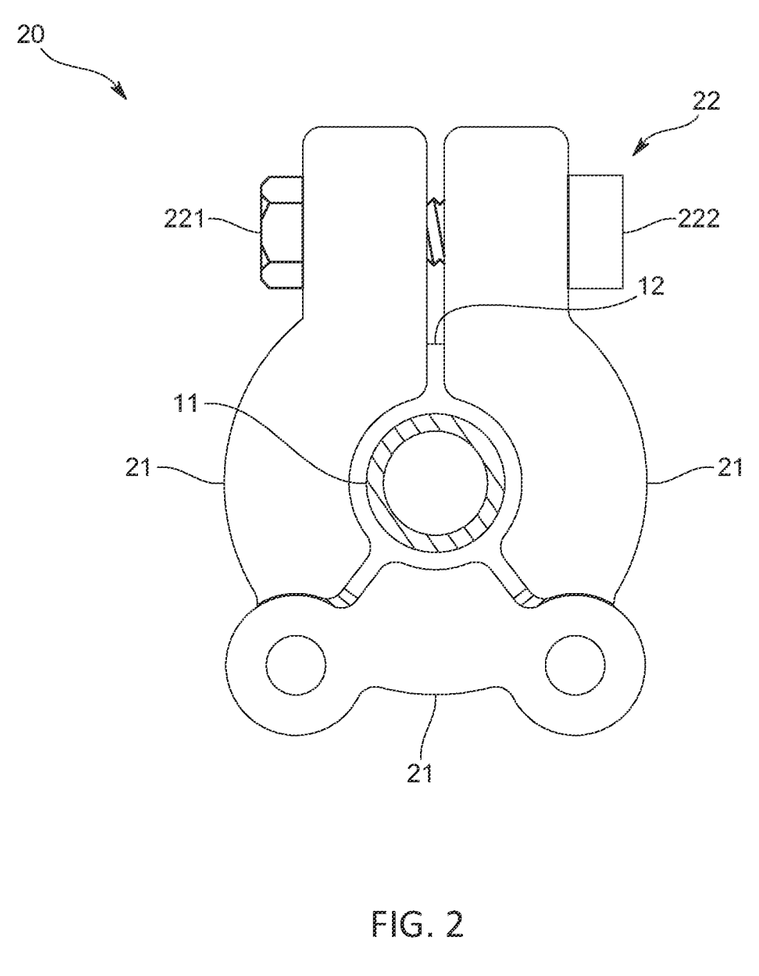
FIG. 2 is a cross-sectional view illustrating a pipe coupling in a non-coupled state in the embodiment.
Figure 3:
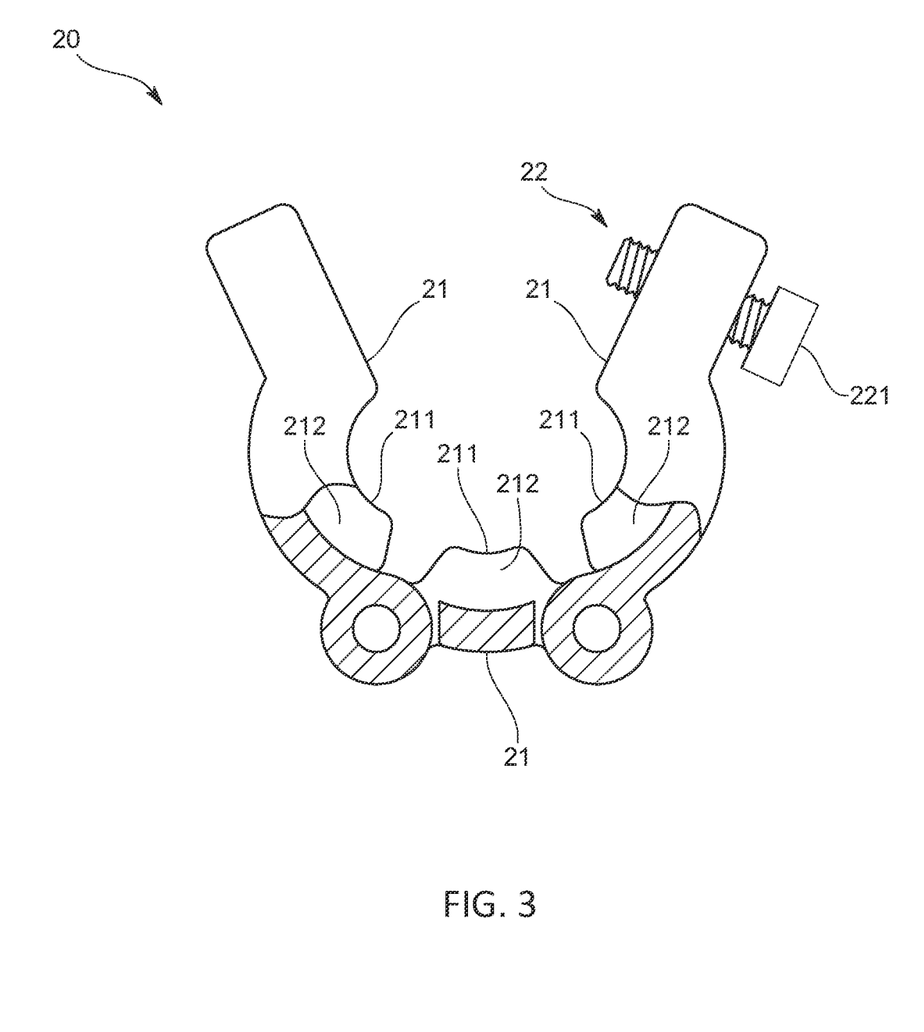
FIG. 3 is a cross-sectional view illustrating the pipe coupling in a coupled state in the embodiment.

The pipe coupling 20 is fitted onto the flanges 12 facing each other to fasten and couple these flanges. As illustrated in FIGS. 2 and 3, the pipe coupling 20 is of a so-called clamp type including a plurality of (in this embodiment, three) unit members 21 that are coupled to each other allowing rotation of the adjacent unit members thereof with respect to each other about an axis, and a fastener 22 that couples the unit members 21 at both ends to make the series of unit members 21 in an annular shape.

In this embodiment, the unit members 21 each have a shape obtained by dividing an annular ring into three when viewed from the axial direction. As illustrated in FIG. 3, the inner peripheral surface of the unit member 21 is formed with a recessed groove 211 having a width allowing the unit member 21 to be fitted onto outer peripheral edge portions of the pair of the flanges 12 facing each other, and extending in the circumferential direction. On each of the side surfaces of the recessed groove 211, an inclined surface 212 corresponding to the inclined surface 14 on the back of the flange 12 is formed.

As illustrated in FIGS. 2 and 3, the fastener 22 includes, for example, a bolt member 221, and a nut member 222. The bolt member 221 is inserted into through holes formed in the distal end portions of the unit members 21 at both ends. Then, by screwing the bolt member 221 into the nut member 222, the unit members 21 at both ends can be coupled, and the inner peripheral diameter of the pipe coupling 20 can be expanded or contracted.

Figure 4:
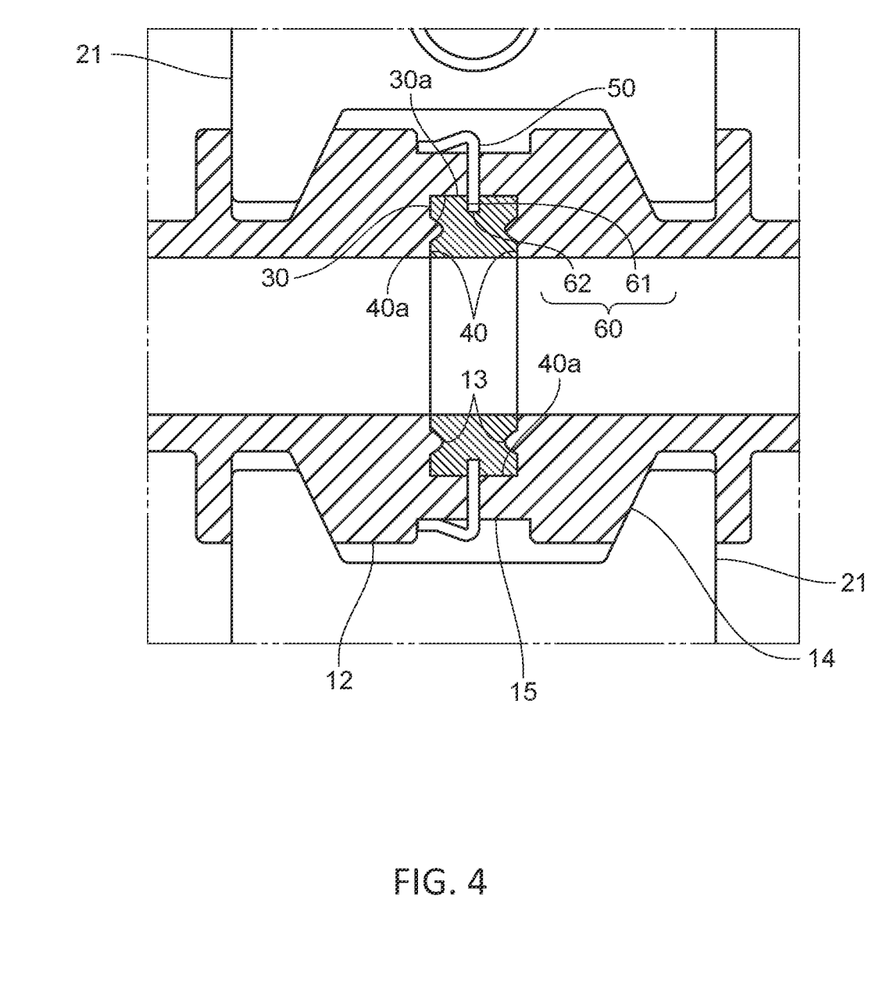
FIG. 4 is an enlarged cross-sectional view illustrating the coupling structure in the embodiment.

As illustrated in FIG. 4, the annular gasket 30 is interposed between the flanges 12 of the above-described pair of pipe members 10, being sandwiched between these flanges 12 and bit by the projections 13, to ensure the airtightness.

In addition, as illustrated in FIG. 4, the coupling structure 100 of the present embodiment is configured using recesses 40 formed individually in the facing surfaces of the flanges 12 of the above-described pipe members 10 facing each other, and is configured to make the pipe axes of the pipe members 10 and the annular gasket 30 coincide with each other by fitting the above-described annular gasket 30 into the recesses 40.

More specifically, the annular gasket 30 of the present embodiment has a cylindrical shape, and the pipe axes of the pair of pipe members 10 and the annular gasket 30 coincide with each other when outer peripheral surfaces 30a of the annular gasket 30 and inner peripheral surfaces 40a of the above-described recesses 40 are in contact with each other.

In the present embodiment, a cylindrical portion fitted into the recess 40 of one of the pipe members 10 and a cylindrical portion fitted into the recess 40 of the other one of the pipe members 10 have the same diameter, and the outer peripheral surfaces 30a of these cylindrical portions and the inner peripheral surfaces 40a of the recesses 40 exhibit the axis alignment function.

Note that since the annular gasket 30 is crushed by the projections 13 as described above, the annular gasket 30 slightly expands in the radial direction. Thus, the annular gasket 30 is configured to make the outer peripheral surfaces 30a of the cylindrical portions and the inner peripheral surfaces 40a of the recesses 40 surface-to-surface contact with each other by being fitted into the recesses 40 with a slight backlash and then being crushed by the projections 13.

Figure 5:
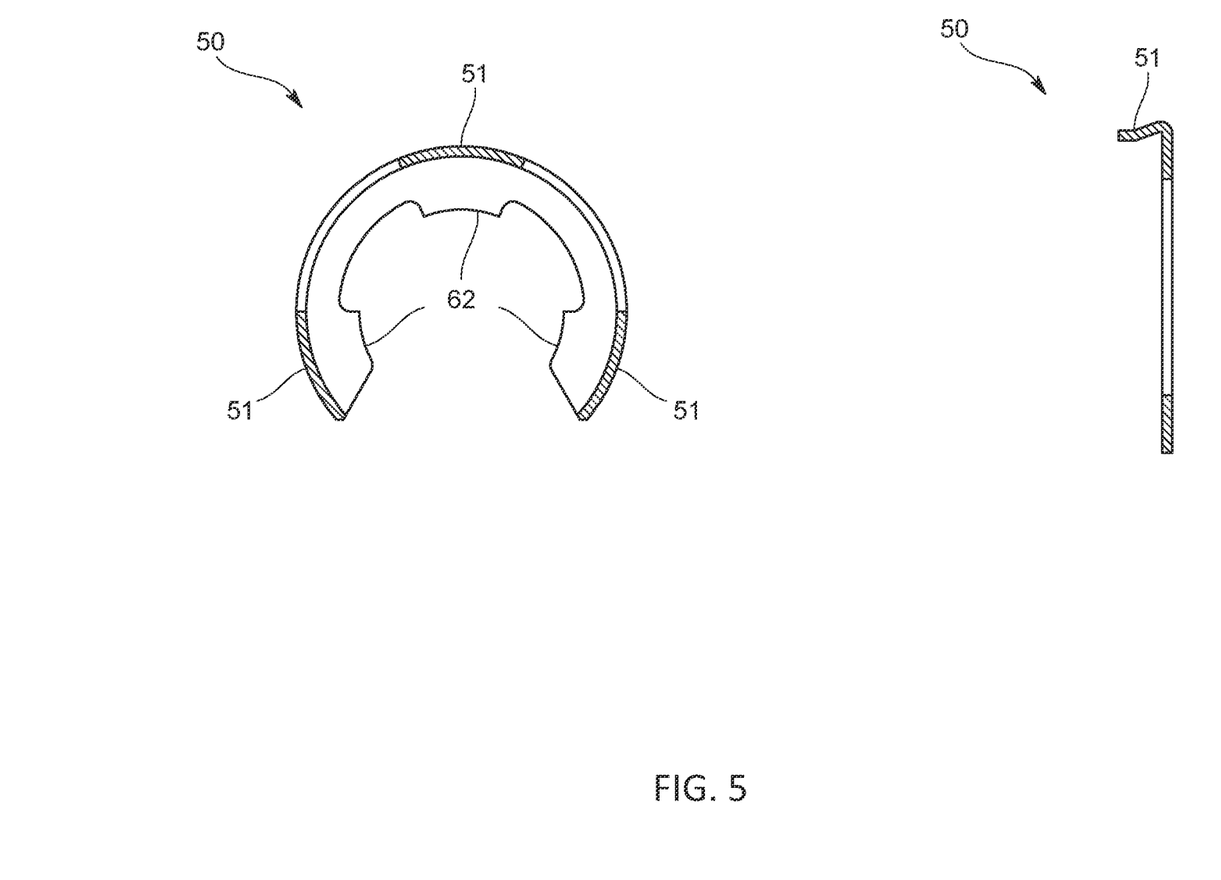
FIG. 5 is a schematic view illustrating a configuration of a retainer in the embodiment.

Furthermore, as illustrated in FIGS. 4 and 5, the coupling structure 100 of the present embodiment includes a retainer 50 fixed to one of the flanges 12 in a state of being attached to the annular gasket 30.

As illustrated in FIG. 5, the retainer 50 exhibits a function of a so-called retaining ring. Specifically, the retainer 50 has a shape obtained by cutting out a portion from an annular ring, and includes a plurality of (in this embodiment, three) claws 51 extending in the axial direction from a plurality of positions on an outer peripheral surface thereof. The plurality of claws 51 is fitted and get caught on the outer peripheral surface of the one flange 12, whereby the annular gasket 30 can be fixed to the one flange 12 together with the retainer 50. Of course, the retainer 50 and the annular gasket 30 can be fixed to the other one of the flanges 12 by orienting the claws 51 in the opposite direction.

As illustrated in FIG. 4, a locking mechanism 60 that locks the retainer 50 to the annular gasket 30 is interposed between the retainer 50 and the annular gasket 30. More specifically, in this embodiment, a locking groove 61 is formed in the outer peripheral surfaces 30a of the annular gasket 30, and protrusions 62 fitted to the locking groove 61 is provided on the inner peripheral surface of the retainer 50, and the locking groove 61 and the protrusions 62 are included in the locking mechanism 60. The locking groove 61 may be formed in the inner peripheral surface of the retainer 50, and the protrusions 62 may be provided on the outer peripheral surfaces 30a of the annular gasket 30.

The locking groove 61 is formed by recessing the outer peripheral surfaces 30a of the annular gasket 30 inward in the radial direction, and is formed over the entire circumference of the outer peripheral surfaces 30a of the annular gasket 30 in this embodiment. Alternatively, the locking groove 61 may be intermittently formed at a plurality of positions in the outer peripheral surfaces 30a of the annular gasket 30.

The protrusions 62 protrude inward in the radial direction from the inner peripheral surface of the retainer 50, and are provided at a plurality of positions (in this embodiment, three positions) on the inner peripheral surface of the retainer 50. More specifically, these protrusions 62 are provided at positions corresponding to the claws 51 in the circumferential direction of the retainer 50. In other words, the protrusions 62 are provided individually inside the claws 51 provided at a plurality of positions.

Next, a method for coupling the pair of pipe members 10 with the above-described coupling structure 100 will be described with reference to FIG. 6.

Figure 6:
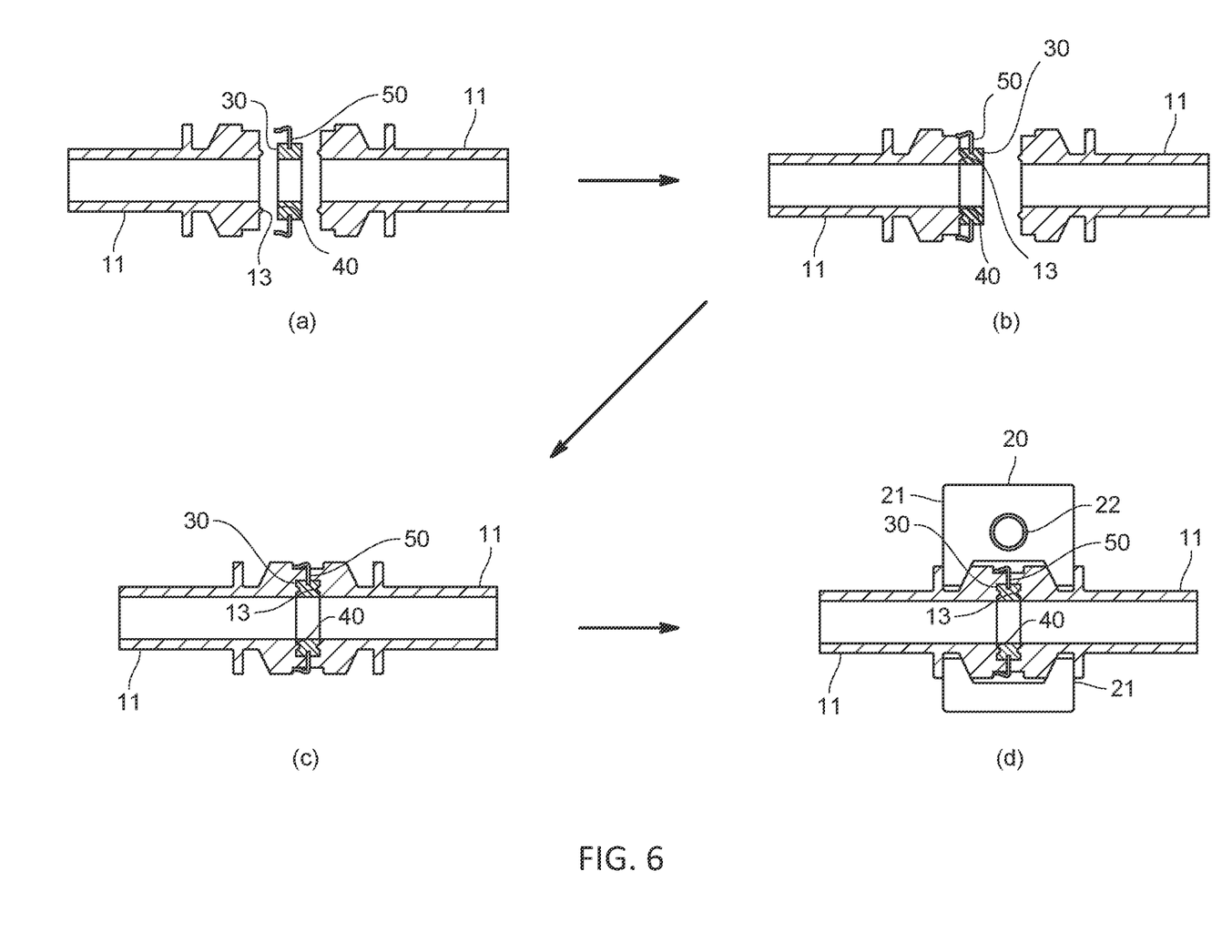
FIG. 6 is a cross-sectional view for describing a coupling procedure of the pipe coupling in the embodiment.

First, the retainer 50 is attached to the annular gasket 30 (FIG. 6 at a). Specifically, the protrusions 62 provided on the inner peripheral surface of the retainer 50 are fitted into the locking groove 61 formed on the outer peripheral surfaces 30a of the annular gasket 30. Accordingly, the locking mechanism 60 becomes functional to lock the retainer 50 to the annular gasket 30.

Next, the claws 51 of the retainer 50 are fitted and get caught on the outer peripheral surface of the flange 12 of the one of the pipe members 10, and the cylindrical portion of the annular gasket 30 facing the one pipe member 10 is fitted into the recess 40 formed in the flange 12 of the pipe member 10 (FIG. 6 at b). Accordingly, the outer peripheral surface 30a of the cylindrical portion and the inner peripheral surface 40a of the recess 40 exhibit the axis alignment function, whereby the pipe axes of the one pipe member 10 and the annular gasket 30 coincide with each other.

Subsequently, the cylindrical portion of the annular gasket 30 facing the other one of the pipe members 10 is fitted into the recess 40 formed in the flange 12 of the pipe member 10 (FIG. 6 at c). Accordingly, the outer peripheral surface 30a of the cylindrical portion and the inner peripheral surface 40a of the recess 40 exhibit the axis alignment function, whereby the pipe axes of the pair of pipe members 10 coincide with each other.

Then, the pair of pipe members 10 are coupled via the pipe coupling 20. Specifically, the series of unit members 21 is made in an annular shape to surround the flanges 12 of the pair of pipe members 10, and then, the unit members 21 at both ends are coupled (FIG. 6 at d). Accordingly, the inclined surfaces 212 of the unit members 21 press the inclined surfaces 14 on the back of the flanges 12 to make the projections 13 bite into the annular gasket 30, so that the pair of pipe members 10 are coupled airtightly.

According to the coupling structure 100 configured as described above, fitting the annular gasket 30 into the recesses 40 formed on the facing surfaces of the flanges 12 of the pair of pipe members 10 can make the pipe axes of the pipe members 10 and the annular gasket 30 coincide with each other, so that the guide ring used in the conventional axis alignment can be eliminated.

As a result, it is possible to ensure the axis alignment performance while reducing the processing cost, and to make the coupling structure 100 compact to make it possible to perform the coupling work and the detaching work of the pipe members 10 without difficulty even in a narrow work space.

In addition, since the cylindrical portions on both sides in the axial direction of the annular gasket 30 have the same diameter, there is no restriction on an orientation of the annular gasket 30 when attached, and the sealing performance can be exhibited when the annular gasket 30 is used in either orientation.

Furthermore, since the retainer 50 is attached to the annular gasket 30 and the annular gasket 30 is held by fixing the retainer 50 to the flange 12, the workability of pipe coupling can be further improved.

In addition, since the locking mechanism 60 is interposed between the retainer 50 and the annular gasket 30, the retainer 50 can be easily attached to the annular gasket 30.

Furthermore, since the retainer 50 includes the plurality of claws 51 and exhibits the function of the retaining ring, the retainer 50 can be easily fixed to the flange 12 of the pipe member 10.

Note that the present invention is not limited to the above embodiment.

Figure 7:
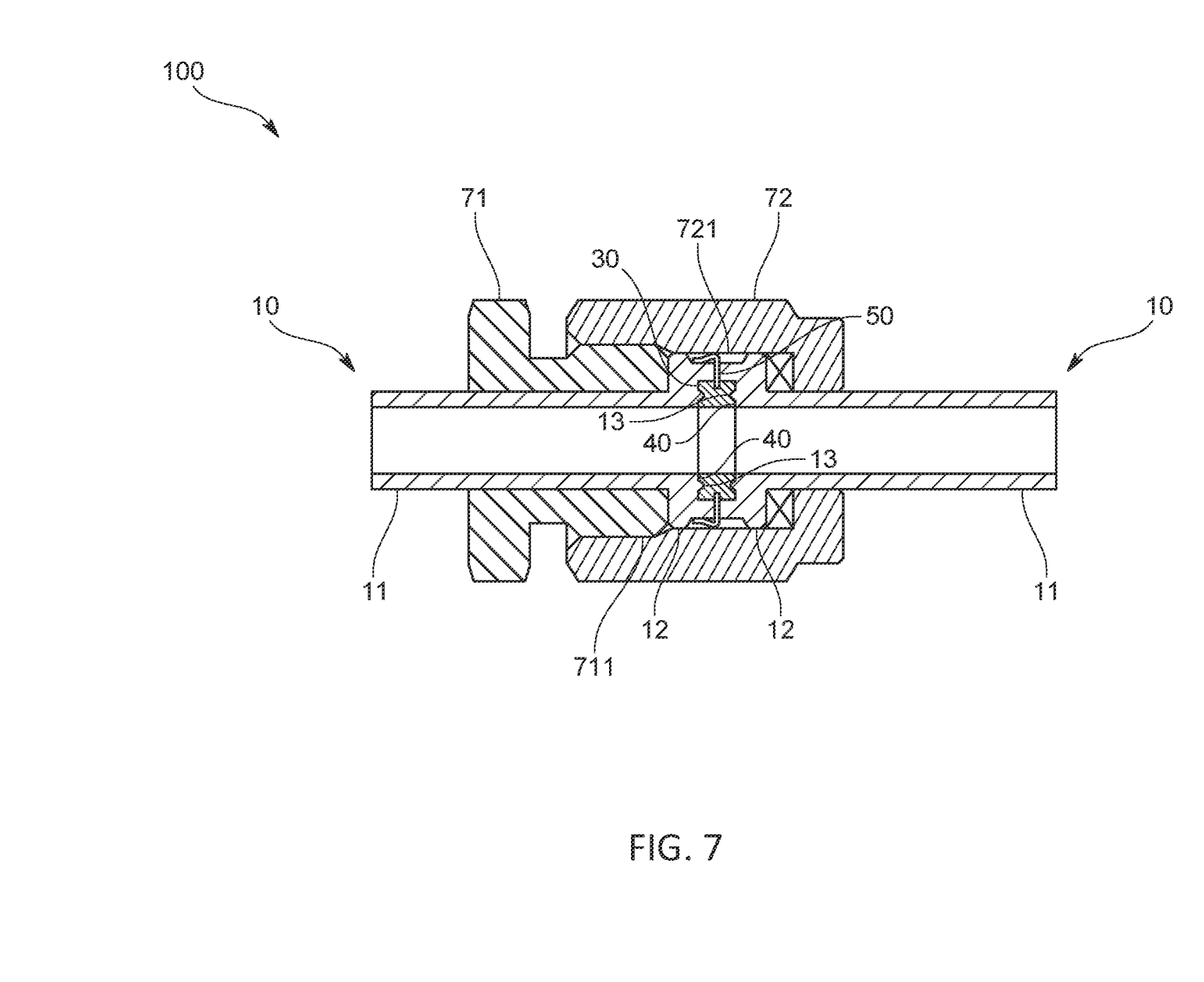
FIG. 7 is a cross-sectional view illustrating a coupling structure in another embodiment.

For example, in the above embodiment, the pipe coupling 20 is of a clamp type. However, as illustrated in FIG. 7, the pipe coupling 20 may include a first nut member 71 fitted into the outer periphery of one of the pipe members 10 and formed with a male screw portion on the outer peripheral surface thereof, and a second nut member 72 fitted into the outer periphery of the other one of the pipe members 10 and formed with a female screw portion, on the inner peripheral portion thereof, screwed with the male screw portion. The pipe coupling 20 may couple the pair of pipe members 10 by screwing the male screw portion of the first nut member 71 and the female screw portion of the second nut member 72.

More specifically, a distal end portion 711 of the first nut member 71 pushes the flange 12 of the one pipe member 10 from the back.

The second nut member 72 is formed with a housing recess 721 that houses the flanges 12 of the pair of pipe members 10, and is configured to receive the flange 12 of the other pipe member 10 from the back on the bottom surface of the housing recess 721.

With the above-described configuration, screwing the male screw portion of the first nut member 71 and the female screw portion of the second nut member 72 causes the first nut member 71 to push the flange 12 of the one pipe member 10 from the back and the second nut member 72 to receive the flange 12 of the other pipe member 10 from the back, and then causes the projections 13 to bite into the annular gasket 30, so that the pair of pipe members 10 are coupled airtightly.

Figure 8:
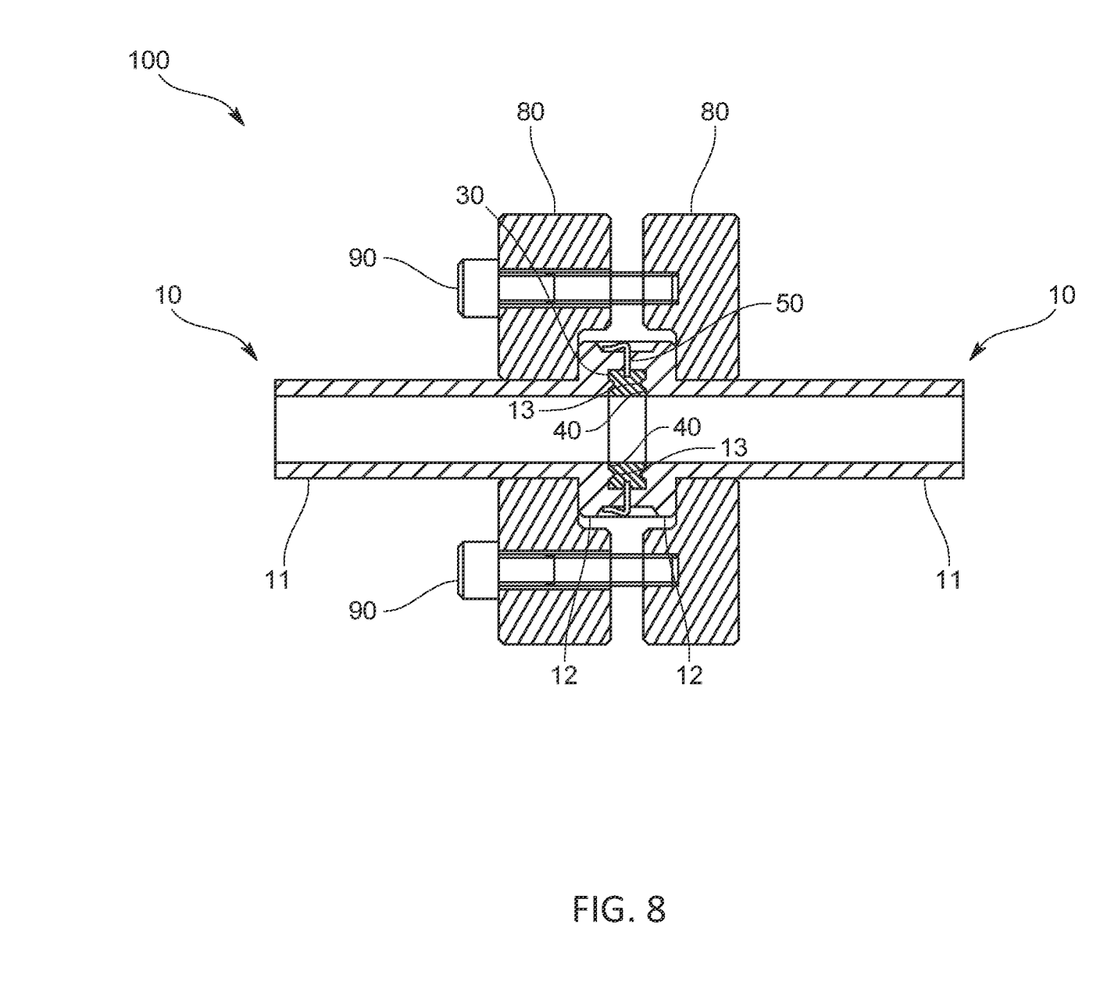
FIG. 8 is a cross-sectional view illustrating a coupling structure in still another embodiment.

As still another embodiment, as illustrated in FIG. 8, the pipe coupling 20 may include a pair of pinching members 80 provided individually on the back of the flanges 12 of the pair of pipe members 10, and fasteners 90 that fasten the pair of pinching members 80. The pipe coupling 20 may couple the pair of pipe members 10 by fastening the pair of pinching members 80 with the fasteners 90.

More specifically, one of the pinching members 80 pushes the flange 12 of the one pipe member 10 from the back, and the other one of the pinching members 80 receives the flange 12 of the other one of the pipe members 10 from the back.

With the above-described configuration, fastening the pair of pinching members 80 with the fasteners 90 causes the one pinching member 80 to push the flange 12 of the one pipe member 10 from the back and the other pinching member 80 to receive the flange 12 of the other pipe member 10 from the back, and then causes the projections 13 to bite into the annular gasket 30, so that the pair of pipe members 10 are coupled airtightly.

The present invention is not limited to the above-described embodiment, and it goes without saying that various modifications can be made without departing from the gist thereof.

INDUSTRIAL APPLICABILITY

According to the present invention, it is possible to ensure the axis alignment performance while reducing the processing cost, and to make the coupling structure compact to make it possible to perform the coupling work and the detaching work of the pipe members without difficulty even in a narrow work space.

The invention claimed is:

1. A coupling structure comprising:
a pipe coupling that couples a pair of pipe members each including a flange at an end portion in a state where the flanges of the pipe members face each other;
an annular gasket interposed between the flanges of the pair of pipe members and having a cylindrical shape;
recesses formed individually in facing surfaces of the flanges facing each other; and
a retainer fixed to one of the flanges in a state of being attached to the annular gasket, wherein
the retainer includes a plurality of claws extending in an axial direction from a plurality of positions on an outer peripheral surface of the retainer,
pipe axes of the pipe members and a central axis of the annular gasket coincide with each other when the annular gasket is fitted into the respective recesses and an outer peripheral surface of the annular gasket is in contact with a respective inner peripheral surface of the respective recesses, and
the plurality of claws fitted into an outer peripheral surface of one of the flanges makes the retainer fixed to the one flange.

2. The coupling structure according to claim 1, wherein the annular gasket includes a portion fitted into one of the recesses and a portion fitted into another one of the recesses that have a cylindrical shape having a same diameter.

3. The coupling structure according to claim 1, further comprising a locking mechanism interposed between the retainer and the annular gasket to lock the retainer to the annular gasket, wherein
the retainer has a shape obtained by cutting out a portion from an annular ring, and
the locking mechanism includes a locking groove formed in one of an inner peripheral surface of the retainer and the outer peripheral surface of the annular gasket, and a protrusion provided on another one of the inner peripheral surface of the retainer and the outer peripheral surface of the annular gasket and fitted in the locking groove.

4. The coupling structure according to claim 1, wherein the pipe coupling includes:
a series of unit members that are coupled allowing rotation of adjacent ones of the unit members with respect to each other; and
a fastener that couples unit members among the unit members at both ends to make the series of unit members in an annular shape, and
the pipe coupling couples the pair of pipe members by fitting the unit members onto the flanges of the respective pipe members in a state where the flanges of the pair of pipe members face each other and fastening the fastener.

5. The coupling structure according to claim 1, wherein the pipe coupling includes:
a first nut member fitted into an outer periphery of one of the pipe members and formed with a male screw portion on an outer peripheral surface; and
a second nut member fitted into an outer periphery of another one of the pipe members and formed with a female screw portion on an inner peripheral portion, screwed with the male screw portion, and
the pipe coupling couples the pair of pipe members by screwing the male screw portion of the first nut member and the female screw portion of the second nut member.

6. The coupling structure according to claim 1, wherein the pipe coupling includes:
a pair of pinching members provided individually on back of the flanges of the pair of pipe members; and
a fastener that fastens the pair of pinching members, and
the pipe coupling couples the pair of pipe members by fastening the pair of pinching members with the fastener.

* * * * *